(12) United States Patent
Rachamadugu

(10) Patent No.: US 8,631,226 B2
(45) Date of Patent: Jan. 14, 2014

(54) METHOD AND SYSTEM FOR VIDEO MONITORING

(75) Inventor: Sreenivas Rachamadugu, Leesburg, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1551 days.

(21) Appl. No.: 11/617,400

(22) Filed: Dec. 28, 2006

(65) Prior Publication Data

US 2007/0106419 A1   May 10, 2007

Related U.S. Application Data

(63) Continuation-in-part of application No. 11/368,750, filed on Mar. 6, 2006.

(60) Provisional application No. 60/714,674, filed on Sep. 7, 2005.

(51) Int. Cl.
G06F 1/24 (2006.01)
G06F 9/00 (2006.01)

(52) U.S. Cl.
USPC .......................... 713/100; 725/144; 725/145

(58) Field of Classification Search
USPC ................... 713/100; 725/144, 145
See application file for complete search history.

(56) References Cited

U.S. PATENT DOCUMENTS

| | | | |
|---|---|---|---|
| 5,303,367 A | 4/1994 | Leenstra et al. | |
| 5,313,630 A | 5/1994 | Namioka et al. | |
| 5,499,371 A | 3/1996 | Henninger et al. | |
| 5,557,790 A | 9/1996 | Bingham et al. | |
| 5,611,076 A | 3/1997 | Durflinger et al. | |
| 5,612,715 A | 3/1997 | Karaki et al. | |
| 5,729,730 A | 3/1998 | Wlaschin et al. | |
| 5,790,176 A | 8/1998 | Craig | |
| 5,799,310 A | 8/1998 | Anderson et al. | |
| 5,831,669 A * | 11/1998 | Adrain | 348/143 |
| 5,845,073 A | 12/1998 | Carlin et al. | |
| 5,852,435 A | 12/1998 | Vigneaux et al. | |
| 5,864,870 A | 1/1999 | Guck | |
| 5,892,900 A | 4/1999 | Ginter et al. | |
| 5,930,446 A | 7/1999 | Kanda | |

(Continued)

FOREIGN PATENT DOCUMENTS

| | | |
|---|---|---|
| EP | 0764951 | 3/1997 |
| EP | 1463058 | 9/2004 |

(Continued)

OTHER PUBLICATIONS

"Advanced Systems Format (ASF) Specification," Microsoft Corporation, Revision Jan. 20, 2002, http://download.microsoft.com/download/E/0/6/E06D8390-1E2A-4978-82BB-311810D8A28D/ASF_Specification.doc, 104 pages, Jun. 2004.

(Continued)

*Primary Examiner* — Jaweed A Abbaszadeh

(57) ABSTRACT

An approach is provided for video monitoring. A video server records an event to output a video master and to generate a video proxy of the master. A monitoring server transmits the video proxy to a central monitoring system that is configured to correlate the video proxy with other video proxies from a plurality of sources.

28 Claims, 10 Drawing Sheets

(56) References Cited

U.S. PATENT DOCUMENTS

| | | | |
|---|---|---|---|
| 5,956,424 A * | 9/1999 | Wootton et al. | 382/192 |
| 6,026,408 A | 2/2000 | Srinivasan et al. | |
| 6,047,291 A | 4/2000 | Anderson et al. | |
| 6,069,627 A | 5/2000 | Conrad et al. | |
| 6,092,154 A | 7/2000 | Curtis et al. | |
| 6,151,622 A | 11/2000 | Fraenkel et al. | |
| 6,211,869 B1 | 4/2001 | Loveman et al. | |
| 6,226,038 B1 | 5/2001 | Frink et al. | |
| 6,226,618 B1 | 5/2001 | Downs et al. | |
| 6,246,803 B1 * | 6/2001 | Gauch | 382/276 |
| 6,263,313 B1 | 7/2001 | Milsted et al. | |
| 6,330,572 B1 | 12/2001 | Sitka | |
| 6,404,446 B1 | 6/2002 | Bates et al. | |
| 6,405,198 B1 | 6/2002 | Bitar et al. | |
| 6,519,571 B1 | 2/2003 | Guheen et al. | |
| 6,522,418 B2 | 2/2003 | Yokomizo et al. | |
| 6,573,907 B1 | 6/2003 | Madrane | |
| 6,643,659 B1 | 11/2003 | MacIssac et al. | |
| 6,658,568 B1 | 12/2003 | Ginter et al. | |
| 6,678,002 B2 | 1/2004 | Frink et al. | |
| 6,698,020 B1 | 2/2004 | Zigmond et al. | |
| 6,714,594 B2 | 3/2004 | Dimitrova et al. | |
| 6,721,490 B1 | 4/2004 | Yao et al. | |
| 6,728,727 B2 | 4/2004 | Komine et al. | |
| 6,732,183 B1 | 5/2004 | Graham | |
| 6,795,506 B1 | 9/2004 | Zhang et al. | |
| 6,865,540 B1 | 3/2005 | Faber et al. | |
| 6,870,887 B2 | 3/2005 | Kauffman et al. | |
| 6,917,979 B1 | 7/2005 | Dutra et al. | |
| 6,934,339 B2 | 8/2005 | Kato | |
| 6,947,959 B1 | 9/2005 | Gill | |
| 6,961,445 B1 * | 11/2005 | Jensen et al. | 382/103 |
| 6,970,510 B1 | 11/2005 | Wee et al. | |
| 7,168,086 B1 | 1/2007 | Carpenter et al. | |
| 7,177,520 B2 * | 2/2007 | Zetts | 386/281 |
| 7,310,111 B2 * | 12/2007 | Ramirez-Diaz et al. | 348/159 |
| 7,409,144 B2 * | 8/2008 | McGrath et al. | 386/248 |
| 7,505,604 B2 * | 3/2009 | Zakrzewski et al. | 382/100 |
| 7,522,163 B2 * | 4/2009 | Holmes | 345/419 |
| 7,577,959 B2 | 8/2009 | Nguyen et al. | |
| 7,629,995 B2 * | 12/2009 | Salivar et al. | 348/143 |
| 7,650,625 B2 * | 1/2010 | Watkins | 725/139 |
| 7,676,820 B2 * | 3/2010 | Snijder et al. | 725/19 |
| 7,782,365 B2 * | 8/2010 | Levien et al. | 348/220.1 |
| 7,783,181 B2 * | 8/2010 | Wilkins et al. | 386/281 |
| 7,902,978 B2 * | 3/2011 | Pederson | 340/541 |
| 7,952,609 B2 * | 5/2011 | Simerly et al. | 348/143 |
| 2001/0034250 A1 | 10/2001 | Chadha | |
| 2001/0051927 A1 | 12/2001 | London et al. | |
| 2002/0035732 A1 * | 3/2002 | Zetts | 725/148 |
| 2002/0046292 A1 | 4/2002 | Tennison et al. | |
| 2002/0052771 A1 | 5/2002 | Bacon et al. | |
| 2002/0056123 A1 | 5/2002 | Liwerant et al. | |
| 2002/0069218 A1 | 6/2002 | Sull et al. | |
| 2002/0108115 A1 | 8/2002 | Palmer | |
| 2002/0122659 A1 * | 9/2002 | McGrath et al. | 386/117 |
| 2002/0145622 A1 | 10/2002 | Kauffman et al. | |
| 2002/0194253 A1 | 12/2002 | Cooper et al. | |
| 2003/0001885 A1 | 1/2003 | Lin et al. | |
| 2003/0005034 A1 | 1/2003 | Amin | |
| 2003/0018978 A1 | 1/2003 | Singal et al. | |
| 2003/0025599 A1 * | 2/2003 | Monroe | 340/531 |
| 2003/0044162 A1 | 3/2003 | Angel | |
| 2003/0084451 A1 | 5/2003 | Pierzga et al. | |
| 2003/0088877 A1 | 5/2003 | Loveman et al. | |
| 2003/0135464 A1 | 7/2003 | Mourad et al. | |
| 2003/0188019 A1 | 10/2003 | Wesley | |
| 2003/0229900 A1 | 12/2003 | Reisman | |
| 2004/0017471 A1 * | 1/2004 | Suga et al. | 348/143 |
| 2004/0059996 A1 | 3/2004 | Fasciano | |
| 2004/0098754 A1 | 5/2004 | Vella et al. | |
| 2004/0131330 A1 * | 7/2004 | Wilkins et al. | 386/55 |
| 2004/0133467 A1 | 7/2004 | Siler | |
| 2004/0136590 A1 * | 7/2004 | Brouwer | 382/154 |
| 2004/0153504 A1 | 8/2004 | Hutchinson et al. | |
| 2004/0168184 A1 | 8/2004 | Steenkamp et al. | |
| 2004/0210823 A1 | 10/2004 | Miura et al. | |
| 2004/0216173 A1 * | 10/2004 | Horoszowski et al. | 725/145 |
| 2004/0223606 A1 | 11/2004 | Enete et al. | |
| 2004/0247284 A1 | 12/2004 | Yamasaki | |
| 2004/0255329 A1 * | 12/2004 | Compton et al. | 725/109 |
| 2004/0268222 A1 | 12/2004 | Kawa et al. | |
| 2004/0268224 A1 | 12/2004 | Balkus et al. | |
| 2005/0073585 A1 * | 4/2005 | Ettinger et al. | 348/155 |
| 2005/0074100 A1 | 4/2005 | Lederman | |
| 2005/0091311 A1 * | 4/2005 | Lund et al. | 709/203 |
| 2005/0149940 A1 | 7/2005 | Calinescu et al. | |
| 2005/0185634 A1 | 8/2005 | Benco et al. | |
| 2005/0195823 A1 | 9/2005 | Chen et al. | |
| 2005/0198125 A1 | 9/2005 | Macleod et al. | |
| 2005/0210520 A1 | 9/2005 | Horvitz et al. | |
| 2005/0262535 A1 | 11/2005 | Uchida et al. | |
| 2005/0262542 A1 | 11/2005 | DeWeese et al. | |
| 2005/0278425 A1 | 12/2005 | Wilsher et al. | |
| 2006/0047749 A1 | 3/2006 | Davis et al. | |
| 2006/0056732 A1 * | 3/2006 | Holmes | 382/286 |
| 2006/0143686 A1 | 6/2006 | Maes | |
| 2006/0146184 A1 * | 7/2006 | Gillard et al. | 348/398.1 |
| 2006/0156219 A1 * | 7/2006 | Haot et al. | 715/500.1 |
| 2006/0161635 A1 | 7/2006 | Lamkin et al. | |
| 2006/0205362 A1 | 9/2006 | Chang et al. | |
| 2006/0236221 A1 | 10/2006 | McCausland et al. | |
| 2006/0259589 A1 | 11/2006 | Lerman et al. | |
| 2006/0263039 A1 * | 11/2006 | Chiang | 386/68 |
| 2006/0274828 A1 * | 12/2006 | Siemens et al. | 375/240.01 |
| 2007/0006177 A1 | 1/2007 | Aiber et al. | |
| 2007/0022404 A1 | 1/2007 | Zhang et al. | |
| 2007/0043860 A1 | 2/2007 | Pabari | |
| 2007/0043875 A1 * | 2/2007 | Brannon, Jr. | 709/231 |
| 2007/0113184 A1 * | 5/2007 | Haot et al. | 715/723 |
| 2008/0043106 A1 * | 2/2008 | Hassapis et al. | 348/153 |

FOREIGN PATENT DOCUMENTS

| | | |
|---|---|---|
| EP | 18964229 | 12/2007 |
| JP | 2000-341635 | 12/2000 |
| JP | 2001-346164 | 12/2001 |
| JP | 2004-088384 | 3/2004 |
| JP | 2004-320667 | 11/2004 |
| WO | WO-97/15018 | 4/1997 |
| WO | WO-97/39411 | 10/1997 |
| WO | WO-00/29980 | 5/2000 |
| WO | WO-02/01384 | 1/2002 |
| WO | WO-2005/027068 | 3/2005 |

OTHER PUBLICATIONS

"Avipreview Frequently Asked Questions", pp. 1-7, Retrieved from the internet: URL:http://www.avipreview.com/faq.htm [retrieved Jan. 21, 2009], Oct. 15, 2002.

Bolle, et al., "Video Libraries: From Ingest to Distribution," IBM T. J.Watson Research Center, Lecture Notes in Computer Science vol. 1614, pp. 15-18, DOI:10.1007/3-540-48762-X_2, Dec. 1999.

David, "News Technology: The Cutting Edge," Appears in Capturing the Action: Changes in Newsgathering Technology, IEEE Colloquium, pp. 4/1-4/8, Oct. 27, 1995.

Gordon-Till, "My Opinion Is, Opinions Are Useful," Information World Review, Issue 184, four pages, Oct. 2002.

* cited by examiner

METHOD AND SYSTEM FOR VIDEO MONITORING

RELATED APPLICATIONS

This application is a continuation-in-part of U.S. patent application Ser. No. 11/368,750, filed Mar. 6, 2006, entitled "Method and System for Providing Distributed Editing and Storage of Digital Media over a Network," which claims the benefit of the earlier filing date under 35 U.S.C. §119(e) of U.S. Provisional Patent Application Ser. No. 60/714,674, filed Sep. 7, 2005, entitled "Method and System for Supporting Media Services"; the entireties of which are incorporated herein by reference.

BACKGROUND INFORMATION

Traditionally, video monitoring (or surveillance) systems have been deployed in a localized manner in which the analysis of events is isolated to a facility, geographic location, or a particular organization. That is, little or no sharing of video information across organizations is performed. From a security standpoint, this lack of coordination can introduce security risks and undermine prevention schemes. The isolation of monitoring systems stems, in part, from the high cost of sharing high fidelity video over a bandwidth constrained telecommunications infrastructure. That is, the technologies involved with video transmission and processing are expensive and inflexible. Notably, delivery of interactive media (which describe real events in the real world in real-time) in general requires the capability to quickly acquire, store, edit, and composite live and other descriptive media by numerous users. Such engineering hurdle has hindered the advancement of high resolution video surveillance.

Based on the foregoing, there is a clear need for approaches that exploit video and communication technologies to more efficiently and cost-effectively support video surveillance applications.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

An apparatus, method, and software for providing video monitoring are described. In the following description, for the purposes of explanation, numerous specific details are set forth in order to provide a thorough understanding of the various exemplary embodiments. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Although the various exemplary embodiments are described with respect to the Motion Picture Expert Group (MPEG) standards and Group of Pictures (GOP) technologies, it is contemplated that these embodiments have applicability to other equivalent video encoding standards and technologies.

Figure 1:
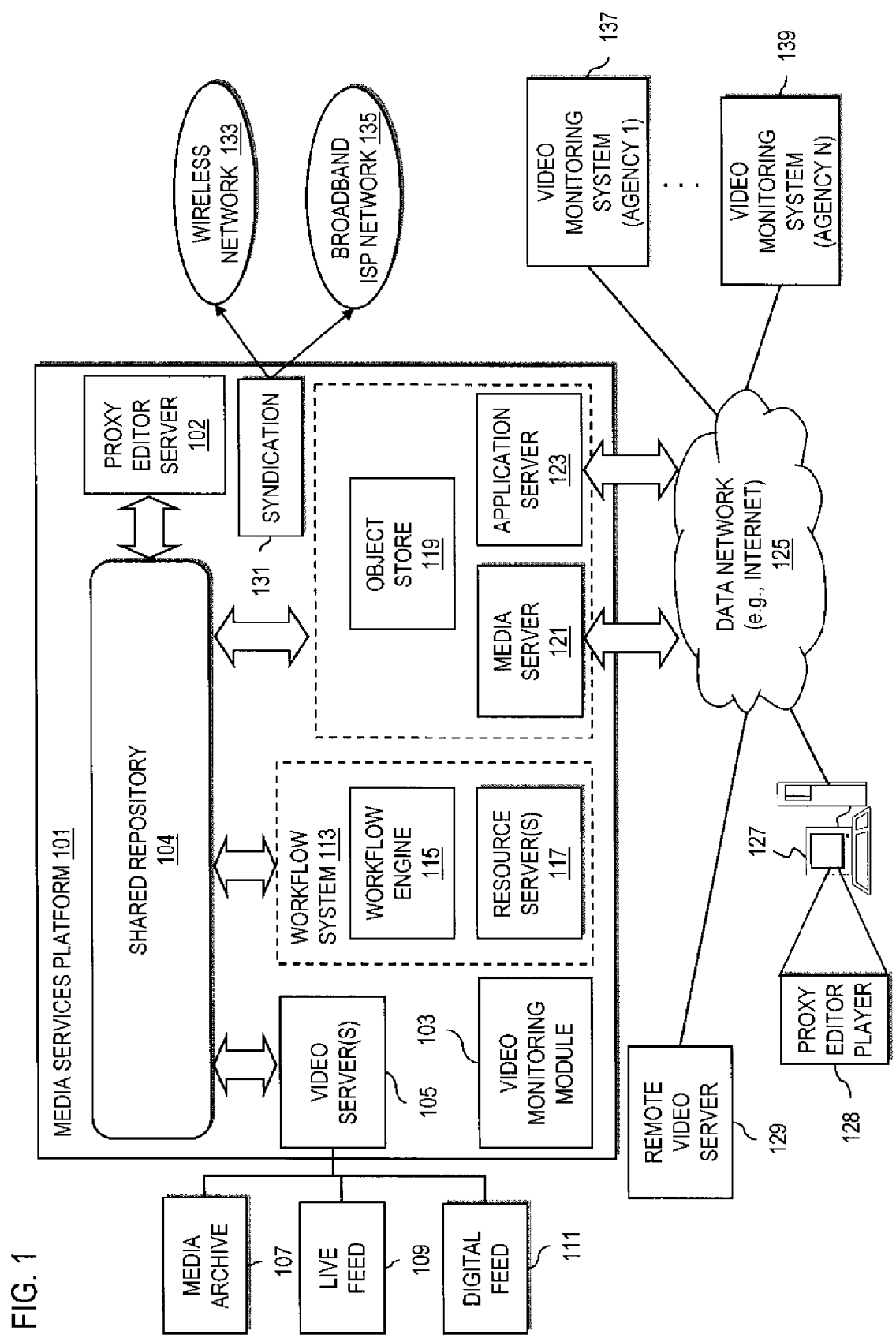
FIG. 1 is a diagram of a media services platform for providing video monitoring, according to an exemplary embodiment.

FIG. 1 is a diagram of a media services platform for providing video monitoring, according to an exemplary embodiment. The media services platform 101 provides a centralized video monitoring service and an integrated media asset management platform with a fully modular architecture that enables users (e.g., customers, subscribers, etc.) to deploy the platform on a module-by-module basis as well as workflow-by-workflow. The platform 101 also supports remote proxy editing using a proxy editing application as executed by a proxy editor server 102, thereby permitting rapid and efficient manipulation of video. As will be more fully described, numerous video proxies can be generated and syndicated to multiple organizations (agencies) for video surveillance.

A video monitoring module 103 supports sharing of video feeds across multiple organization (i.e., enterprises) using the video proxies. This sharing of video proxies can be performed in real-time to generate alerts relating to events that are monitored.

In addition to video monitoring applications, it is recognized that there is an increasing need for professional, cost-effective editing of video feeds, wherein the edited files can be provided over different alternative networks. In an exemplary embodiment, the editing application utilizes low-resolution version of the video content (i.e., "video proxy") for the purposes of editing; hence, the editing application is referred to as a "proxy editor." The architecture of the media services platform 101, according to an exemplary embodiment, supports compact to enterprise-scale deployments, and ensures that storage and processing capabilities are robust and scalable, suitable for mission-critical video surveillance and video broadcast operations.

The real time delivery of events such as surveillance video footage presents problems, where it is necessary to produce compressed files to reduce the bandwidth for transmission over a data network. Video files for such purposes need to be produced in an encoded format using, for instance, Group of Picture (GOP) technology, otherwise the raw digital stream would render timely transmissions and file storage impractical.

Thus, a video stream is created to include a sequence of sets of frames (i.e., GOP). By way of example, each group, typically 8 to 24 frames long, has only one complete frame represented in full. This complete frame is compressed using only intraframe compression, and thus is denoted as an I frame. Other frames are utilized and include temporally-compressed frames, representing only change data with respect to the complete frame. Specifically, during encoding, motion prediction techniques compare neighboring frames and pinpoint areas of movement, defining vectors for how each will move from one frame to the next. By recording only these vectors, the data which needs to be recorded can be substantially reduced. Predictive (P) frames refer to the previous frame, while Bi-directional (B) frames rely on previous and subsequent frames. This combination of compression techniques is highly effective in reducing the size of the video stream.

With GOP systems, an index is required to decode a given frame. Conventionally, the index is only written at the end of the file once the file has completed the encoding process. As a result, no index is available until the recording is completed. The implication is that the production of an edited version of the file cannot commence until the recording is completed and this index file produced. The media services platform 101 addresses this drawback by creating a separate index file, which can be supplemental to the routinely generated index file, during the recording and encoding process.

Accordingly, the platform 101, in an exemplary embodiment, can provide remote editing over any data network (e.g., Internet Protocol (IP)-based) that can support connectivity to the proxy editor server 102, whereby editing can commence without having to wait for completion of the recording. The proxy editor application resident on the server 102 enables developers to build professional-level desktop video editing applications using, for example, the Microsoft Windows Media Series platform. In an exemplary embodiment, an edited file is rendered using a high-resolution MPEG-2 master. Alternatively, an associated EDL is delivered to an integrated craft edit for completion. The media services platform 101 can support various workflows for craft editor integration, such as, store and forward, and instant editing. As for the store and forward approach, the content can be viewed, logged and edited using the proxy editor into packages for automated transcoding (from master MPEG-2) and delivery to popular non-linear editing systems (e.g., AVID Unity and AVID Media Composer, Adobe Premiere, Apple Final Cut Pro, Media 100, iFinish, Pinnacle Liquid and Vortex). With respect to instant editing, using the proxy editor player 128, the user can execute an ingest of a live feed, which can be viewed, logged and edited. The user can then export an EDL to a craft editor, which can be a third party craft editor (e.g., Incite Editor E3) that is integrated with the media services platform 101. When imported into Incite, the timeline is rebuilt frame-accurately, pointing to the MPEG-2 master on the shared SAN 104. Once the edit is complete, the craft editor creates a new MPEG-2 digital master, which is automatically re-ingested back into the platform 101 when dropped in an appropriate Hot Folder.

The platform 101 also provides significant scalability due to decoupled storage. Conventional editing systems required direct disk access to the video file. This poses a severe scalability issue, as every editing function (e.g., play, scrub, etc.) from the editing client creates disk traffic. If the storage cannot timely respond, a conventional editing application often freezes or crashes, such a scenario is unacceptable for real time feeds. With the media services platform 101, the content is downloaded once on each client cache; thus, the centralized storage requirements are reduced by a very significant factor (depending on editing type).

As seen in FIG. 1, the media services platform 101 utilizes a shared repository 104 that stores media (e.g., digitized video) content ingested from one or more video servers 105. Ingesting involves obtaining content into the media services platform 101, and can be accomplished locally or from a remote location. In an exemplary embodiment, the repository 104 is deployed as a shared Storage Area Network (SAN) or NAS (Network Area Storage), which has the capability for high-performance video ingest and playback. The shared SAN 104 can utilize scalable Fibre Channel switch fabric to interface with a Fibre Channel disk array and nearline tape libraries. The video servers 105, as will be more fully described in FIG. 6, can interface any type of content sources, such as a media archive 107, a live feed 109, or a digital feed 111.

The media services platform 101 includes a workflow system 113, which comprises a workflow engine 115 and one or more resource servers 117 to support editing and distribution of digital media. The automated workflow provides the ability to automate and orchestrate repetitive workflows. In particular, the workflow system 113 offers users an overview of their work and associated events; that is, the system 113 supports an application that shows the status and progress of each job and links to relevant applications that enable the users to perform their tasks and advance the project towards completion. The workflow engine 115 controls workflow jobs and dispatches them to the resource servers 117. Communication among the resource servers 117 is facilitated by, for example, Microsoft Message Queuing. It is noted that any technology plugged into the workflow system 113 can be automated—e.g., for video monitoring, pre-processing, transcoding, Digital Rights Management (DRM) protection, watermarking, delivery, or any other purpose required.

In addition to providing individual users a central point for managing their work, the workflow system 113 is also useful as a monitoring system. For example, the system 113 can support a graphical user interface (GUI) on the user side, such that users can quickly determine through visual indicators whether tasks have been completed or error conditions exist. The users (e.g., administrators) can "drill down" to view more detail. Also, jobs can be paused, restarted (from any stage), aborted and deleted from the workflow application. This capability provides users with full control over the priority of the jobs. Additionally, the system 113 can record timing information for every step of a task, thereby enabling generation of reports on delivery turnaround etc.—e.g., for Service Level Agreement (SLA) reporting.

According to an exemplary embodiment, the media services platform 101 can be implemented with a pre-configured, standard set of common workflows. For instance, these workflows can support delivery of files for video monitoring, rendering of edits and delivery of content from the video server 105. Moreover, customizable workflows are supported.

As shown, the media services platform 101 comprises core servers, such as an object store 119, a media server 121, and an application server 123. In an exemplary embodiment, the object store 119 contains configuration information for the workflow system 113. Configuration information include, in an exemplary embodiment, parameters of every service, the capabilities of every resource server 117, the definition of workflows, and the real time status of every job. The object store 119 supports the various applications that interface with it through an object store Application Program Interface (API). According to an exemplary embodiment, the object store 119 has an object-based database schema (e.g., Microsoft SQL (Structured Query Language) Server, for example. The media server 121 receives stream broadcasts and serves the stream on to individual user workstations using, for example, Microsoft Windows Media. The stream contains, for example, Society of Motion Picture and Television Engineers (SMPTE) timecode, enabling the stream to be used as a frame-accurate source for live logging.

The application server 123 provides dynamic web site creation and administration functions, such as a search engine, and database capabilities. In an exemplary embodiment, the application server 123 executes Microsoft Internet Information Server (IIS), and can be configured for high availability and load-balancing based on industry standard components.

The media server 121 and the application server 123 interface with the data network 125, which can be a corporate network or the Internet. The application server 123 is thus accessible by a workstation 127, which can be any type of computing device—e.g., laptop, web appliance, palm computer, personal digital assistant (PDA), etc. The workstation 127 can utilize a browser (e.g., web-based), generally, to communicate with the media services platform 101, and a downloadable applet (e.g., ActiveX controls) to support distributed video editing functionality. The browser in conjunction with the applet is referred to an editing (or editor) interface—e.g., the proxy editor player 128. The workstation 127 can also be equipped with voiceover microphone and headphones to facilitate the editing process. The proxy editor player 128 communicates with the proxy editor server 102 to enable the viewing and editing of content, including live video, remotely. Editing functionalities include immediate access to frame-accurate content, even while being recorded, full audio and video scrubbing of source clips and edit timelines over the network 125, and generation of Advanced Authoring Format/Edit Decision List (AAF/EDL) files for craft edit integration.

To connect to the media services platform 101, the workstation 127 need not require special hardware or software. As mentioned, the workstation 127 need only be configured to run a browser application, e.g., Internet Explorer, for communication over the data network 125. With this user interface, changes or upgrades to the workstation 127 are not required, as all the applications are hosted centrally at the platform 101.

In addition to the video server 105 within the media services platform 101, a remote video server 129 can be deployed to ingest content for uploading to the platform 101 via the data network 125. The video servers 105, 129 include, in an exemplary embodiment, a longitudinal timecode (LTC) reader card as well as other video interfaces (e.g., RS-422 control card, Windows Media Encoder and Matrox DigiServer video card). Video editing relies on the use of timecodes to ensure precise edits, capturing all in "in points" and "out points" of the edits. An edited video can be characterized by an edit decision list (EDL), which enumerates all the edits used to produce the edited video. LTC timecodes are recorded as a longitudinal track, analogous to audio tracks. With LTC, each frame time is divided into 80 bit cells. LTC timecodes are transmitted serially in four-bit nibbles, using Manchester codes.

The video servers 105, 129 can be remotely controlled by the workstation 127. Also, these servers 105, 129 can connect to the shared SAN 104 via Fibre Channel and a file system by, e.g., ADIC™.

A syndication (or distribution) function 131 can then distribute content over various channels, such as a wireless network 133 (e.g., cellular, wireless local area network (WLAN)), and a broadband Internet Service Provider (ISP) network 135. Depending on the capabilities supported by the wireless or wired access network (e.g., networks 133 and 137), rich services, such as presence, events, instant messaging (IM), voice telephony, video, games and entertainment services can be supported. The syndication function 131 automates the creation and delivery of content and metadata to very specific standards for a range of target systems without manual intervention. The media services platform 101 operates on a "set it and forget it" principle. In other words, once a configuration is specified, no other input is required thereafter. For instance, a configuration of a new subscription is set to the required content categories, the technology used to create each file as well as the specific set of parameters are specified, and the file-naming conventions and delivery details are indicated. Every subsequent delivery from the workflow application simply implements the subscription when the correct criteria are met. Whenever the user requires a new output format, the user can specify the various configuration parameters, including the codec, frame rate, frame size, bit rate, and encoder complexity.

Although the video server 105, the workflow engine 115, the object store 119, the media server 121, and the application server 123 are shown as separate components, it is recognized that the functions of these servers can be combined in a variety of ways within one or more physical component. For example, the object store 119, the application server 123, and the workflow engine 115 can reside within a single server; and the video server 105 and the media server 121 can be combined into a common server.

As mentioned above, in addition to video monitoring applications, the media services platform 101 enables media asset management, rapid production, and robust, cost-effective proxy editing capabilities. By way of illustration, management of media assets to support broadband video on demand (VOD) is described. One of the first tasks involved with VOD applications is ingesting full length movies into the video servers 105 for mastering and editing (e.g., removing black, stitching tapes together, adding legal notices etc). The masters are then stored on the shared SAN 104. The content is then transcoded to a high quality media stream format, such as Microsoft Windows Media Series, and delivered automatically with metadata to their broadband video pay-per-view portal (e.g., any one or more of the networks 133 and 135).

Additionally, the media services platform 101 can offer video archiving services. For instance, customers can extend their online storage with nearline tape and manage content seamlessly across multiple storage devices using add-on archive modules. Online storage can be backed up and/or migrated to tape according to automated policies. Advantageously, this archival approach can be transparent to the users; that is, the users are never aware that the master video is no longer stored on expensive disk-based storage. In an embodiment, a library application can be implemented with the media services platform 101 to provide seamless integration with offline video and data tape archives. Further, the media services platform 101 provides high integration with existing production workflows through its capability to transcode and deliver any content contained in the archive to, for example, popular non-linear editors (e.g., AVID™ editor).

Furthermore, the media services platform 101 enables flexible, cost-effective content aggregation and distribution, which is suitable for content service providers. Typical workflows involve aggregation of content from owners in such formats as Motion Pictures Expert Group (MPEG)-2 or Windows Media, along with metadata in extensible Markup Language (XML) files, using pre-configured File Transfer Protocol (FTP) hot folders. "Hot folders" are predefined folders that trigger a workflow event (e.g., file conversion, compression, file transfer, etc.) upon movement of files into the folder. These owners can submit content directly to the workflow system 113 for automatic transcoding, Digital Rights Management (DRM) protection and syndication to multi-channel operators.

According to an exemplary embodiment, the media services platform 101 utilizes a unified user interface (e.g., web browser) for accessing applications supported by the platform 101. It is recognized that typical production and content delivery workflows often involve the use of multiple separate applications: one application for logging, a second application for encoding, a third one for editing, a fourth application for asset management, and so on. Consequently, the challenge of effectively managing workflows is difficult. The task is even more daunting in a multi-channel production and distribution environment, as greater elements need to coordinated and more applications have to be learned over traditional television environments.

The media services platform 101 advantageously simplifies this task by permitting access to the multitude of applications via a single unified user interface as part of a coherent workflow. In this manner, although various technologies are involved, the user experience is that of a single, user-friendly suite of tools, which shield non-technical users from the complex integration of applications and technologies.

The applications supported by the platform 101 include the following: video monitoring (surveillance), media asset management and search, video editing, video server services, workflow, syndication, upload of media, library service, administration, quality assurance, copyright protection, music cue sheet services, and reporting. In addition, the users can develop their own applications within the unified user interface. Asset management permits users to manage the location of content within organized folder structures and categories. The asset search function offers a generic search capability across the entire object store 119.

The media services platform 101 also provides a flexible and cost-effective approach for proxy logging and editing of live and archive material. Such editing services can be in support of news and sport editing, archive browsing and editing, mobile, broadband and IPTV (Internet Protocol Television) production and mastering, and promotion production. The editing application provides viewing and logging of live feeds, frame-accurate proxy logging and editing, and remote proxy editing (e.g., utilizing Windows Media Series proxy format). In addition, the editing application can support instant logging and editing while the feed is recording, as well as audio and video scrubbing. This editing application includes the following capabilities: edit timeline with effects; voiceover (while editing remotely—which is ideal for translation workflows); save edit projects with versions; generate thumbnail and metadata from within the editing user interface; and export EDL's or render finished edits ready for transcoding and delivery. With this application, a user, through an inexpensive workstation 127, can efficiently master a movie for VOD distribution, rough-cut a documentary, or create a fully-finished sports highlight video with voiceover and effects.

The media services platform 101, in an exemplary embodiment, utilizes a Windows Media Series codec, which allows high quality video (e.g., DVD-quality) to be logged and edited across the data network 125. Further, the platform 101 employs intelligent caching to ensure that the applications are as responsive as editing on a local hard drive, even over low-bandwidth connections.

The upload application allows users to ingest digital files into the media services platform 101 and submit them to any permitted workflow. The users (with administrative responsibilities) can control which file types are allowed, which workflows are compatible, and the way in which different types of content are processed. The upload application can facilitate submission of the files to automatic workflows for hands-off end-to-end processing as well as to manual workflows that require manual intervention.

The upload application is complemented by a hot folder system, wherein workflow activities are automatically initiated upon movement of files into and out of the hot folders. The file system folders can be pre-configured to behave like the upload application and pass files of particular types to the workflows. Metadata for each asset provided in accompanying extensible mark-up language (XML) files can be acquired and mapped directly into the object store 119.

The reporting application enables users to create "printer-friendly" reports on any information stored in the object store 119. The reporting application is pre-configured with a number of default reports for reporting on content delivery. Users can filter each report by selecting a desired property of the data, e.g., subscription name, or start and end date. Through the API of the media services platform 101, users (and system integrators) can create new report templates and queries.

The library application offers the ability to manage physical media that contain instances of assets managed in the media services platform 101. Even with continuing expansion in the use of digital media, traditional media continue to play an important role. Typical production environments possess a number of video tapes, DVDs or other physical media for storing content and data. Some environments utilize large established archives.

In mixed media environments, it is beneficial to manage digital and physical instances of content in an integrated manner. Accordingly, the library application provides the following capabilities. For example, the application permits the user to generate and print barcodes for the physical media and shelves, with automatic naming as well as bulk naming (with configurable naming conventions). Also, barcodes are employed for common actions, thereby allowing completely keyboard-free operation for checking in/out and shelving of the physical media. The library application additionally can manage items across multiple physical locations, e.g., local and master libraries. Further, the application supports PDA-based applications with a barcode scanner for mobile checking in/out and shelving. The library application advantageously simplifies management of multiple copies of the same asset on several physical media and storage of multiple assets on the same tape or DVD. The library application can further be used in conjunction with robotic tape libraries to track tapes that have been removed and shelved.

Moreover, the media services platform 101 provides an administration function to tailor system configuration for different customers. It is recognized that a "one size fits all" configuration for all users is non-existent. That is, each user, department, organization and customer has its own set of requirements. Therefore, the media services platform 101 supports concurrent use of multiple configurations. For example, each deployment can configure to its own user groups, create new workflows, integrate new services, support new content types, and specify new output media formats. The customer can also change and add metadata structures and fields, and integrate existing web-based applications into the user interface. The above capabilities can be executed, via the administration application, with immediate effect without shutting down the platform 101. Additionally, in a multi-department deployment scenario, multiple logical instances of the media services platform 101 can be configured with their own unique configurations.

According to an exemplary embodiment, the media services platform 101 can be implemented as a turn-key system within a single box—e.g., in-a-box flight case. Under this configuration, there is no need for a costly and time-consuming IT (information technology) integration undertaking to rack the components or integrate them into the customer's network. Under this arrangement, the platform 101 is be configured as a plug-and-play system, connecting to the network automatically.

As shown, one or more video monitoring systems 137, 139, corresponding to different agencies or organizations, can interact with the video monitoring module 103 to correlate events, as next explained.

Figure 2:
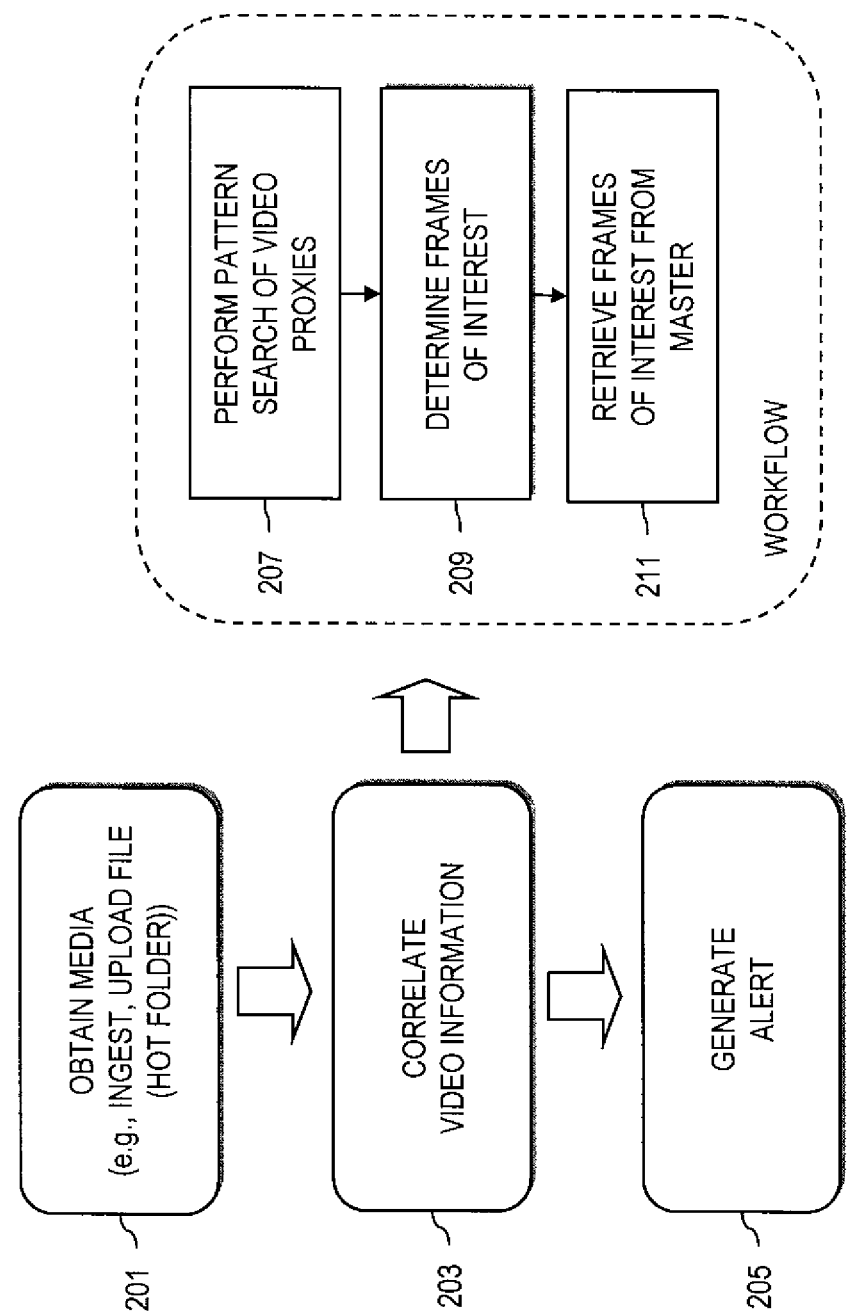
FIG. 2 is a diagram of a workflow process utilized in the system of FIG. 1 for video monitoring, according to an exemplary embodiment.

FIG. 2 is a diagram of a workflow process utilized in the system of FIG. 1 for video monitoring, according to an exemplary embodiment. For the purposes of explanation, the workflow capability of the media services platform 101 is described with respect to video monitoring. In step 201, the media that captures an event is obtain; the media can undergo an ingest process or simply exists as a digital file (e.g., pre-recorded security video) that can be uploaded (using the upload application as earlier explained). Ingesting is the process of capturing content into the media services platform 101 and can occur locally or remotely with respect to the platform 101. If uploaded, the user delivers the project to selected hot folders that automatically define categorization.

The media, or video information, is then correlated with a video or image archive (e.g., media archive 107), per step 203. The correlation is used to generate an alert, per step 205. By way of example, a search for patterns or desired match of images within the video proxies is conducted, as in step 207. In step 209, the frames of interest are determined, whereby the associated frame information is used to retrieve the corresponding frames from the master (step 211).

Figure 3:
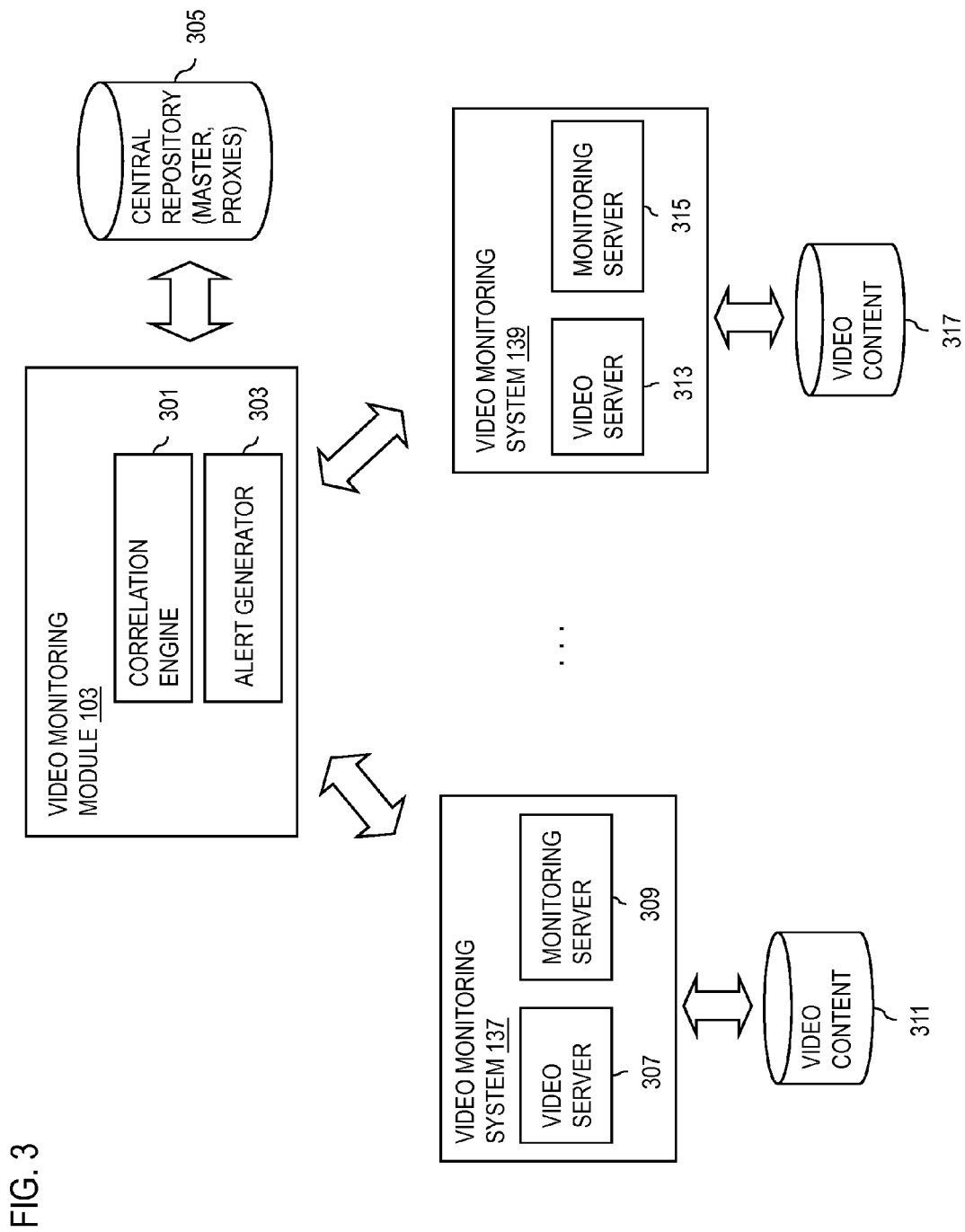
FIG. 3 is a diagram of a centralized video monitoring system, according to an exemplary embodiment.

FIG. 3 is a diagram of a centralized video monitoring system, according to an exemplary embodiment. The video monitoring module 103, as seen, can include a correlation engine 301 and an alert generator 303, which operates in conjunction to correlate video information and output alerts based on the determined level of correlation. A central repository 305 is accessible by the video monitoring module 103 to store video master files and the video proxies. It is noted that, in an exemplary embodiment, the video monitoring systems 137, 139 are the source of the video files (both master and associated video proxies).

According to one embodiment, the video monitoring system 137 includes a video server 307 for generating a video file of an event that is subject of the surveillance. The video monitoring system 137 additionally utilizes a monitoring server 309 to analyze the video from the server 307. Further, the video monitoring system 137 maintains a local database 311 that stores video content. Such video content can include the video proxies and/or the associated master files. Likewise, the video monitoring system 139, which may be associated with another organization from that of the system 137, utilizes a video server 313 and a monitoring server 315. Further, the system 139 similarly employs a local database 317.

The video proxies are frame-accurate, and thus, can be used to map to their corresponding master files for extracting the required high resolution portions.

Under the above arrangement, a video stream (e.g., video proxy) can be distributed to multiple systems 137, 139. In turn, each of these video monitoring systems 137, 139 can search for a desired image or information against their local databases 311, 317. The results of these searches can be reported to the video monitoring module 103, which acts as a central entity for coordinating alerts to these system 137, 139.

In an exemplary embodiment, the video monitoring systems 137, 139 can utilize different video formats. Also, if the source of video information originates from the centralized video monitoring module 103, this module 103 can convert to the necessary video formats to ensure effective sharing of video information.

Figure 4:
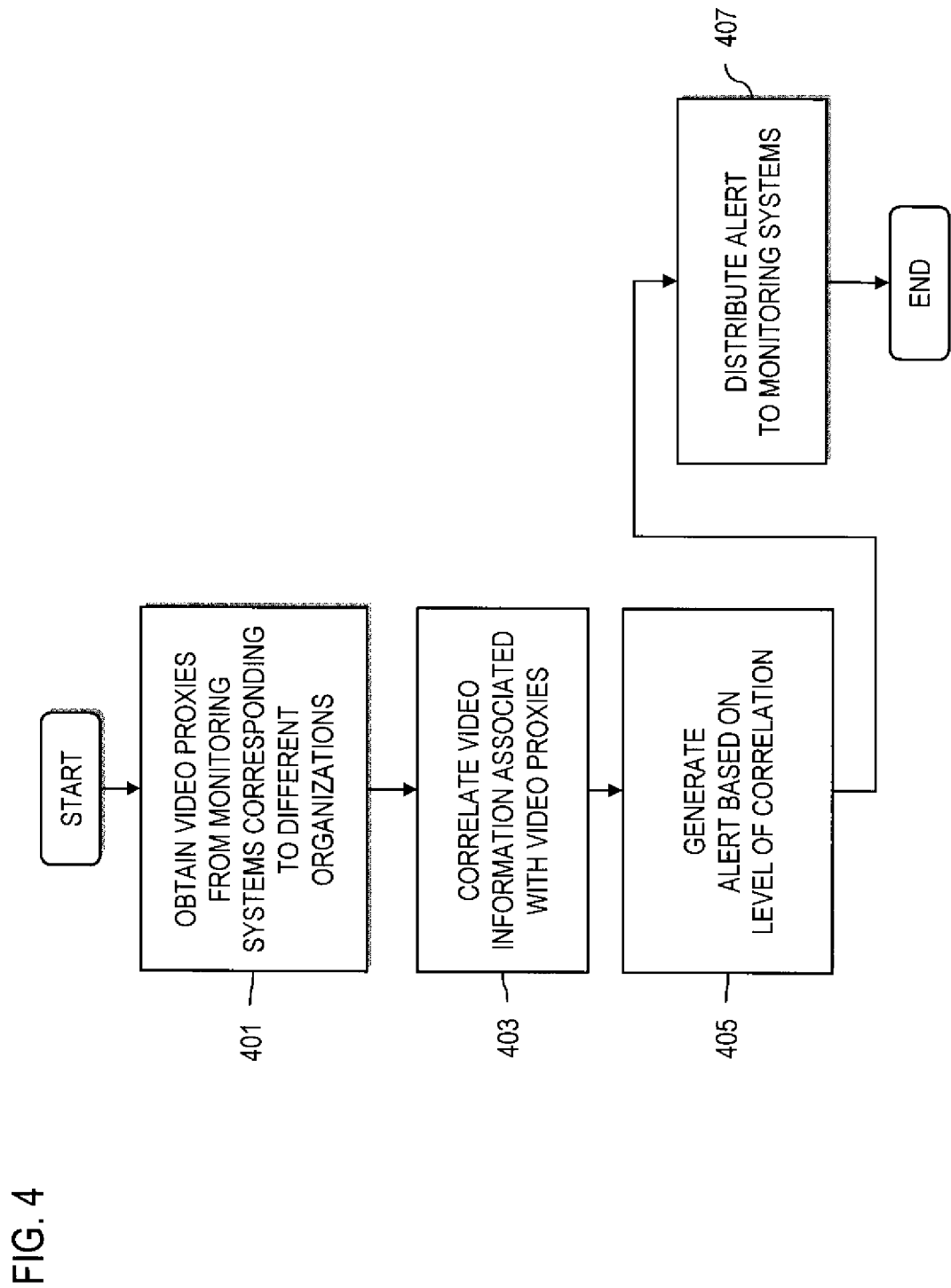
FIG. 4 is a flowchart of a process for correlating video information, according to an exemplary embodiment.
Figure 5:
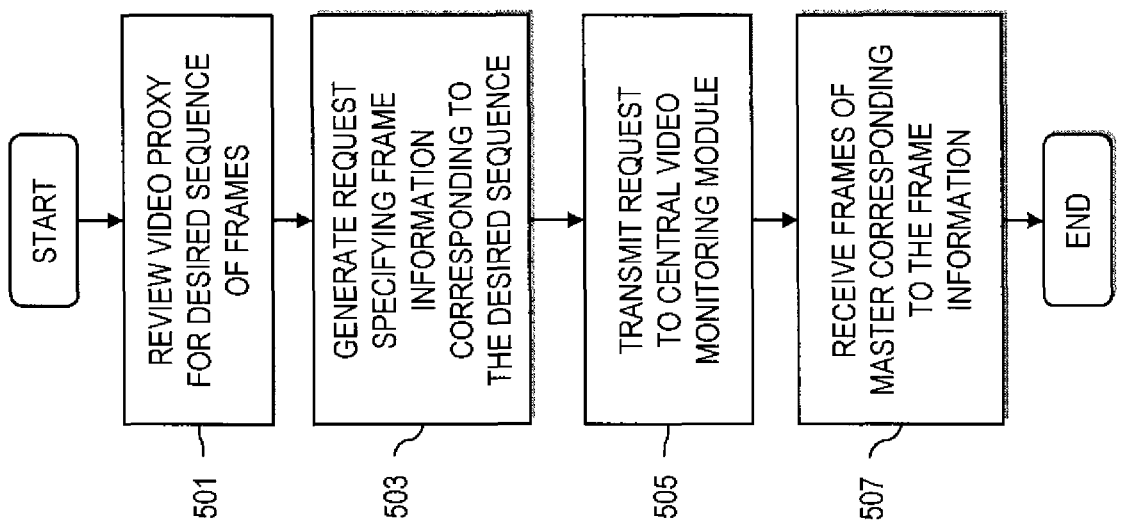
FIG. 5 is a flowchart of a process for retrieving a desired sequence of frames from a video master, according to an exemplary embodiment.

The operation of the video monitoring module 103 is now described with respect to FIGS. 4 and 5.

FIG. 4 is a flowchart of a process for correlating video information, according to an exemplary embodiment. In this scenario, the video monitoring module 103 provides a centralized monitoring capability to analyze video information from various organizations (or agencies). In step 401, video proxies from each of the video monitoring systems 137, 139 are obtained. The video monitoring module 103 then correlates the video information associated with the video proxies using the correlation engine 301. Thereafter, the alert generator 303 selectively outputs an alert, depending on the criteria established for the correlation (step 405). In step 407, the alert is provided to the video monitoring systems 137, 139.

FIG. 5 is a flowchart of a process for retrieving a desired sequence of frames from a video master, according to an exemplary embodiment. In this example, each of the video monitoring systems 137, 139 can review their respective video proxies for a desired sequence of frames, as in step 501. Under this scenario, it is assumed the high resolution masters are stored in the central repository 305; in this manner, the video monitoring systems 137, 139 need not manage a large database or employ more extensive processing power (thereby reducing the cost of the individual monitoring systems 137, 139).

In step 503, the video monitoring system 137, for instance, generates a request for the high resolution master corresponding to the desired sequence of frames. The request is transmitted to the video monitoring module 103, as in step 505. In an exemplary embodiment, the request includes frame information of the video proxy; this frame information is used to map to the proper portion of the master. The video monitoring system 137, in response to the request, accesses the central repository 305 and retrieves the requested portion of the master. The file is then transmitted to the video monitoring system 137 (step 507).

Details of how frame-accurate video proxies are generated are described in FIGS. 6-9.

Figure 6:
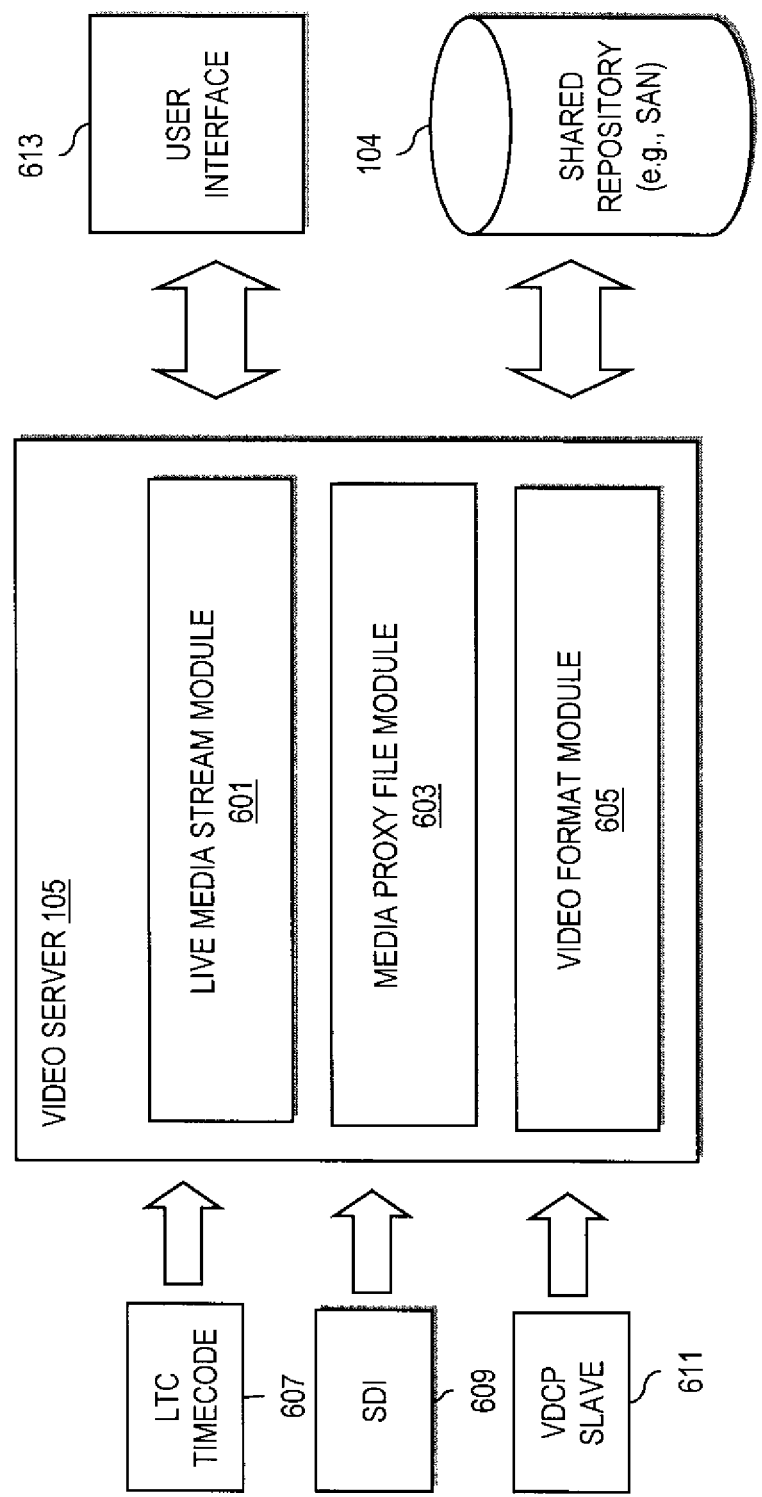
FIG. 6 is a function diagram of a video server in the system of FIG. 1, according to an exemplary embodiment.

FIG. 6 is a function diagram of a video server in the system of FIG. 1, according to an exemplary embodiment. As mentioned, the video server 105, among other functions, is capable of handling live broadcast video in a flexible, feature rich and cost-effective manner. In this example, the video server 105 can be slaved by a Video Disk Communications Protocol (VDCP)-compliant automation system. It is noted that the video server 105 can support both National Television System Committee (NTSC) and Phase Alternating Line (PAL) standards. The video server 105 is controllable from any user workstation (e.g., workstation 127) without geographical constraint. The video server 105 can in turn control, for instance, an attached video tape recorder (VTR) over an RS-422 interface, thereby allowing frame-accurate recording and lay back to tape, and preserving timecode through the entire process.

In an embodiment, the video server 105 includes a live media stream module 601, a media proxy file module 603, and a video format module 605. The live media stream module 601 communicates with the user interface 613 to provide logging and monitoring functions. The media proxy file module 603 supports the capability to perform editing functions during recording of the video. The video format module 605 converts a raw video stream into a standardized format—MPEG-2, for example. The modules 603 and 605 interface the repository 104 to store the ingested contents.

As shown, the server 105 can support various input sources: an LTC time code source 607, a Serial Digital Interface (SDI) source 609, and a VDCP slave source 611. The video server 105 can generate multiple outputs in real-time from the SDI source 607, in contrast to conventional video servers which generate only a single output. The modules 601, 603, 605 generate three types of outputs. One output is that of MPEG-2, in which the user can select between long-GOP and I-frame for each server, ranging from DVD-quality 5 Mbps long-GOP to 50 Mpbs I-frame only. The audio is captured at 48 kHz, for instance. The live media stream module 601 can generate a live media stream (e.g., Windows Media Series) for broadcast over a network (e.g., networks 133, 135 of FIG. 1) to one or more media servers (e.g., media server 121), which serve the stream on to individual user workstations. The stream can include SMPTE timecode, thereby providing a frame-accurate source for live logging.

Finally, the media proxy file module 603 can produce a file (e.g., Windows Media proxy file) for storage in the SAN 104. The proxy editor permits this file, according to an embodiment, to be opened for viewing and editing while the file is still being written. Thus, in conjunction with the proxy editor, the video server 105 supports fast-turnaround production of live events without the need for dedicated high-bandwidth networks and expensive edit suites, and without sacrificing quality or functionality.

In addition to the robust video editing functionality, the media services platform 101 provides frame synchronization of proxies, as next explained.

Figure 7:
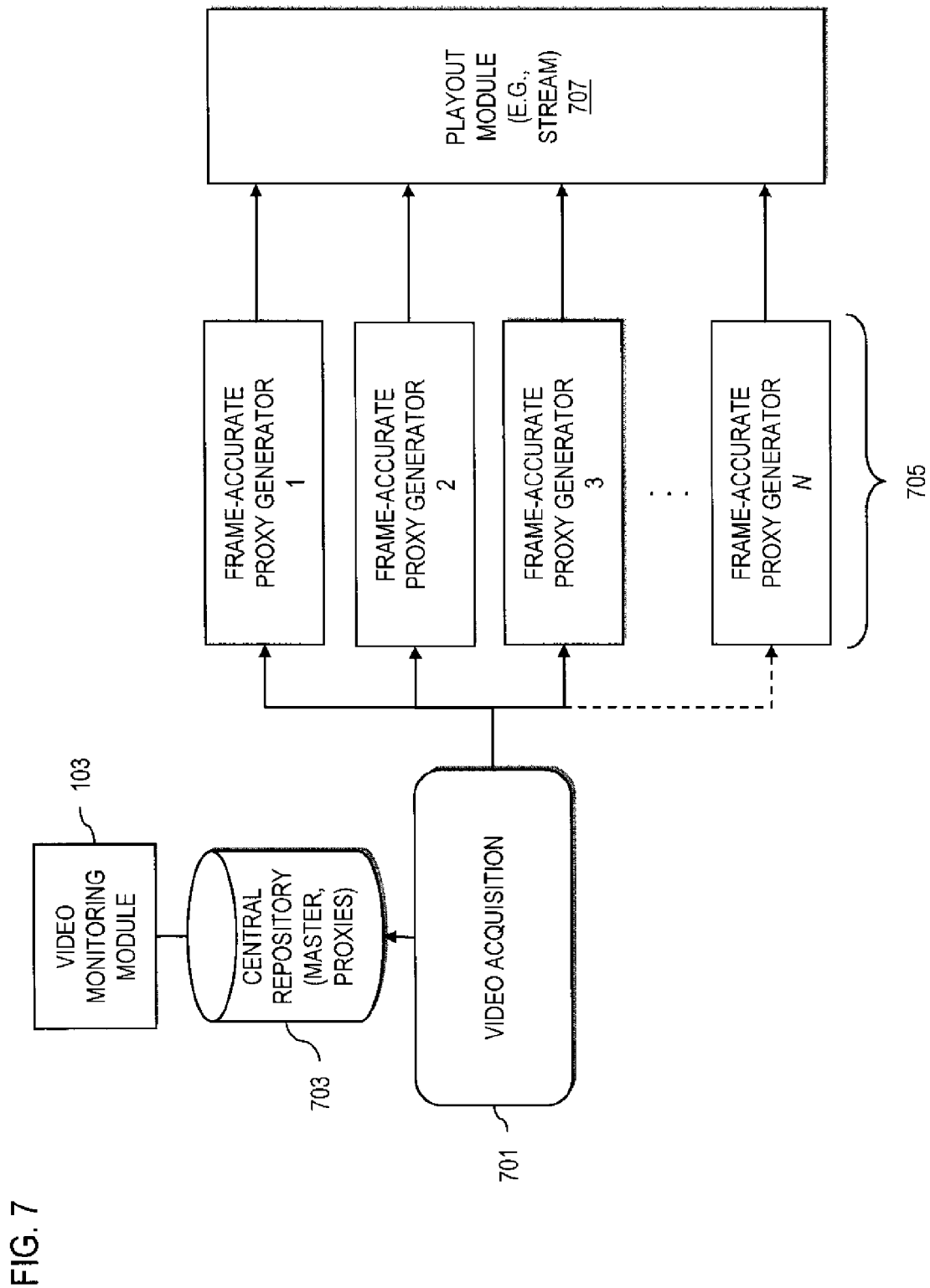
FIG. 7 is a diagram of system for generating frame-accurate proxies, according to an exemplary embodiment.

FIG. 7 is a diagram of system for generating frame-accurate proxies, according to an exemplary embodiment. Under this scenario, a video acquisition module 701 can generate a hi-fidelity (or high resolution) video master from a video feed, such as a live broadcast feed. The master can be stored in a central repository 703, serving as an archive for masters as well as the associated video proxies. The module 701 also provides the video master to one or more proxy generators 705. Each of the proxy generators 705 can produce frame-accurate video proxies from the video master. The video proxies, in an exemplary embodiment, are low-resolution proxies having a variety of media formats. The particular format depends on the application and/or device that is to display the video proxy. By way of example, the number of proxy generators 705 can be determined by the types of media that is supported, wherein each of the generators can correspond to a different media format. The outputs of the proxy generators 705, in an exemplary embodiment, can be sent to a playout module 707 for playing out the proxies as streams (e.g., MPEG, or other media streams).

Figure 8:
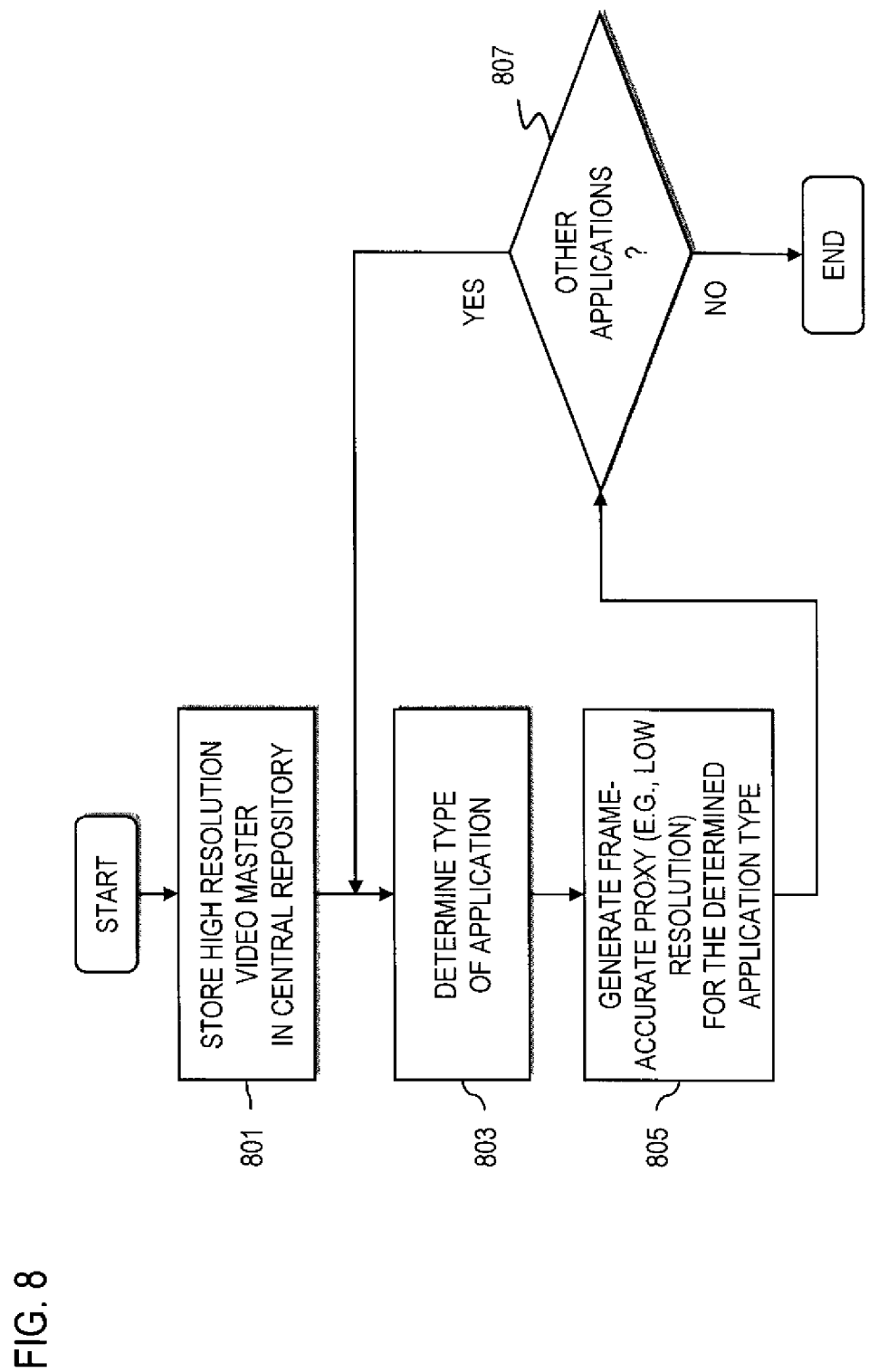
FIG. 8 is a flowchart of a process for generating proxies of different formats depending on the applications, according to an exemplary embodiment.

FIG. 8 is a flowchart of a process for generating proxies of different formats depending on the applications, according to an exemplary embodiment. In step 801, a high resolution video master is stored in the central repository 403. Next, the type of application that will be displaying the video proxy is determined, per step 803. The appropriate frame-accurate proxy generator (e.g., 1 . . . N) is invoked to produce a proxy that is compatible with the determined application. If other applications are to be supported (as determined in step 807), steps 803 and 805 are repeated.

Figure 9:
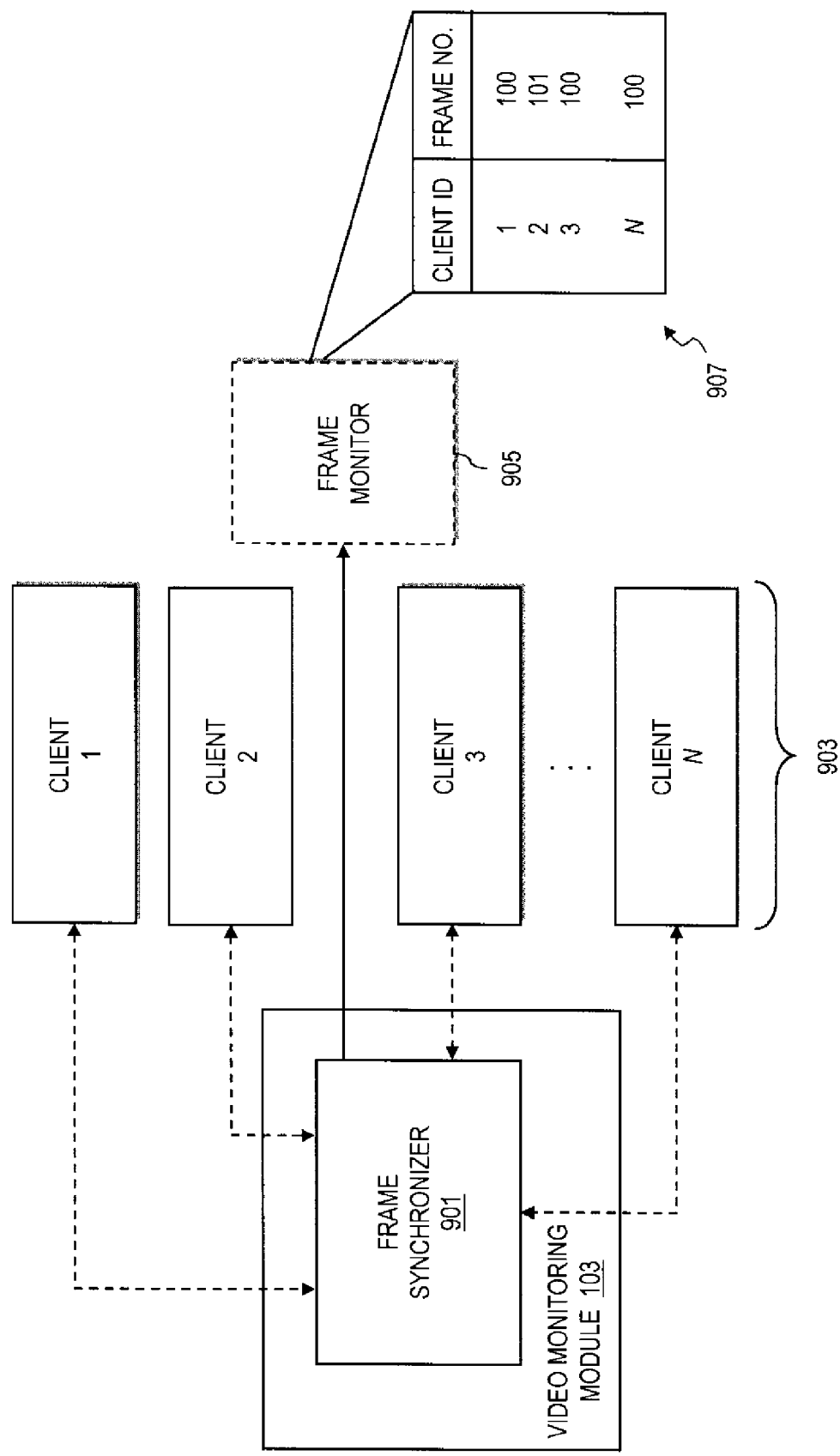
FIG. 9 is a diagram of a frame synchronizer capable of supporting a video monitoring environment, according to an exemplary embodiment.

FIG. 9 is a diagram of a frame synchronizer capable of supporting a video monitoring environment, according to an exemplary embodiment. A frame synchronizer 901, in this example, resides within the video monitoring module 103 and communicates with one or more clients 903 (or applications). The frame synchronizer 901 includes a frame monitor function 905 to track frame information for the video proxies of the respective clients 903 (these clients 903 can correspond to the video monitoring systems 137, 139). In an exemplary embodiment, a table 907 includes a field for identification of the client (e.g., Client ID) and associated field specifying the frame number. As shown, clients 1, 3 and N are at frame number 100, while client 2 is at frame number 101. Depending on which client is designated as the lead—i.e., controls the collaboration, the frame synchronizer 901 can synch up the frames of the video proxies to frame number 100 or frame number 101. For example, if client 2 is the lead, then the frame synchronizer 901 would update the frame of the other clients to frame 101.

The update process for distributing the frame information can be a broadcast or multicast message to the clients 903. Alternatively, the frame information can be unicast to the appropriate clients 903.

The above described processes relating to video monitoring may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
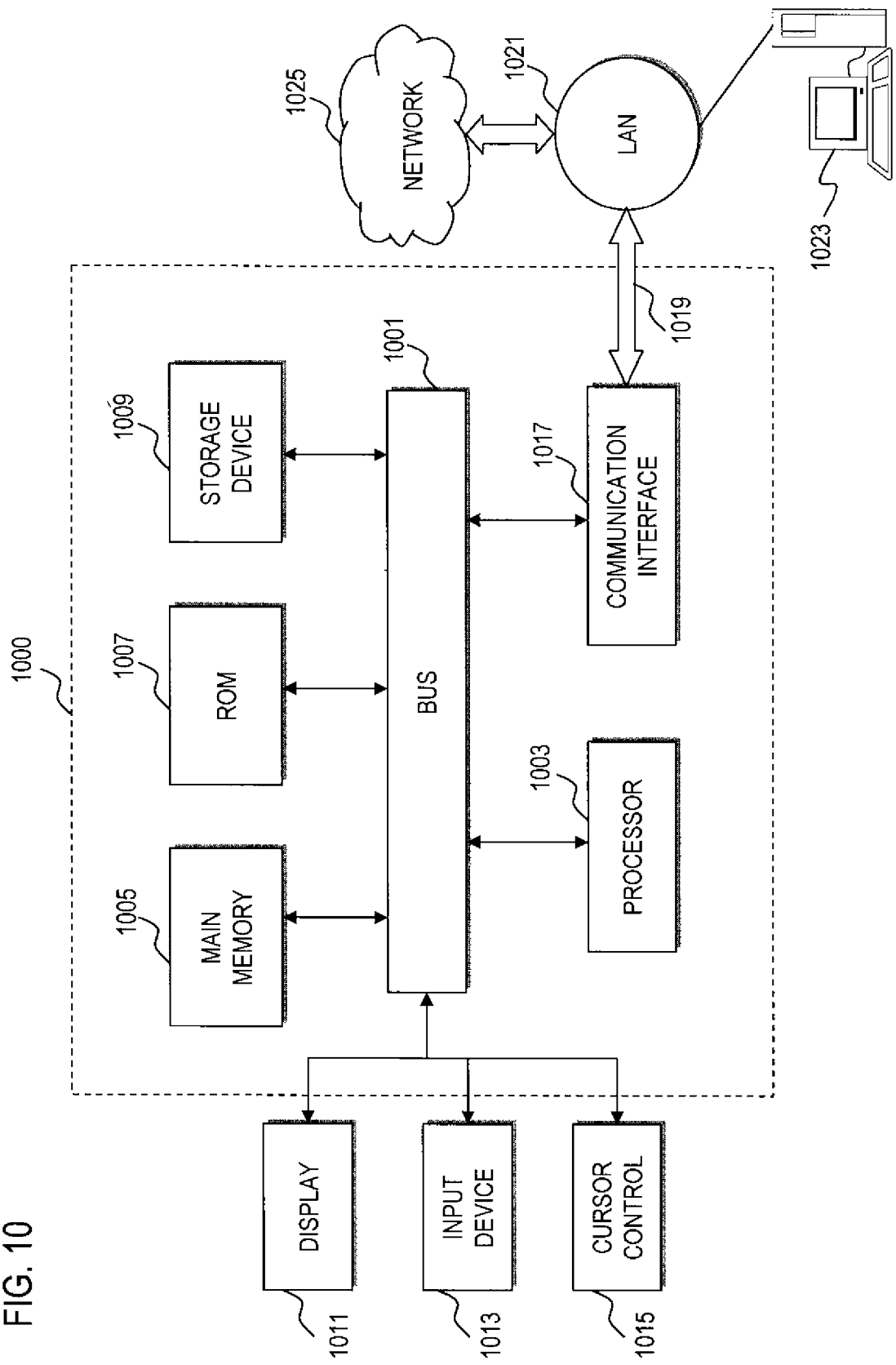
FIG. 10 is a diagram of a computer system that can be used to implement various exemplary embodiments.

FIG. 10 illustrates a computer system 1000 upon which an exemplary embodiment can be implemented. For example, the processes described herein can be implemented using the computer system 1000. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to an exemplary embodiment, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement the exemplary embodiment. Thus, exemplary embodiments are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an exemplary embodiment through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of various embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

The following patent applications are incorporated herein by reference in their entireties: co-pending U.S. patent application Ser. No. 11/617,263 filed Dec. 28, 2006, entitled "Method and Apparatus for Synchronizing Video Frames"; co-pending U.S. patent application Ser. No. 11/617,355 filed Dec. 28, 2006, entitled "Method and Apparatus for Providing On-Demand Resource Allocation"; and co-pending U.S. patent application Ser. No. 11/617,314 filed Dec. 28, 2006, entitled "Method and System for Providing Remote Workflow Management."

What is claimed is:

1. A method comprising:

receiving a first video proxy of a first master surveillance video of a monitored event, captured by a first monitoring system;

receiving a second video proxy of a second master surveillance video of the monitored event, captured by a second monitoring system, wherein the first and second video proxies are of lower resolution than the first and second master surveillance videos;

correlating video information, associated with the first video proxy and the second video proxy, to determine a level of correlation;

generating, based on the level of correlation, an alert related to the monitored event;

storing the first master surveillance video and the second master surveillance video in a database;

receiving a request for access to a mapped portion of the first master surveillance video or the second master surveillance video based on frame information derived from the correlating, and transmitting the mapped portion to the first monitoring system and the second monitoring system in response to the request.

2. A method according to claim 1, further comprising: transmitting the alert to the first monitoring system and the second monitoring system.

3. A method according to claim 1, wherein the correlating is an activity of a workflow.

4. A method according to claim 1, wherein, when the first video proxy is generated in a first format that is compatible with the first monitoring system, and the second video proxy is generated in a second format that is compatible with the second system, the first format being different from the second format, the method further comprising:

converting the first video proxy into the second format, or converting the second video proxy into the first format.

5. A method according to claim 1, wherein the first monitoring system includes a local database, the first monitoring system being configured to compare content of the local database, related to the monitored event, with the first video proxy.

6. A method according to claim 5, wherein the second monitoring system includes a local database configured to store video information, the second monitoring system being configured to compare content of the local database, related to the monitored event, with the second video proxy, the comparison being concurrent with the comparison performed by the first monitoring system.

7. A method according to claim 1, wherein the database is a centralized database.

8. A method according to claim 1, wherein the first master surveillance video and the second master surveillance video are output from live feeds of the monitored event.

9. A method according to claim 1, wherein the request is processed by a workflow engine configured to determine a format of the mapped portion in response to the request, the method further comprising:

transmitting the mapped portion, at a specified time, in the determined format.

10. A method according to claim 1, wherein the first video proxy is received by a network device including a handheld computer, a wireless personal digital assistant (RDA) device, or a personal computer.

11. A system comprising:

a first processing module configured to receive a first video proxy of a first master video of an event under surveillance, obtained at a first monitoring system, and to receive a second video proxy of a second master video of the event under surveillance, obtained at a second monitoring system, wherein the first and second video proxies are of lower resolution than the first and second master videos;

a second processing module configured to correlate video information associated with the first video proxy and the second video proxy, to determine a level of correlation, and generate, based on the level of correlation, an alert related to the event under surveillance; and a database configured to store the first video master and the second video master, and receive a request for access to a mapped portion of the first video master or the second video master based on frame information derived from the correlation, and the first processing module being further configured to transmit the mapped portion to the first monitoring system and the second monitoring system in response to the request.

12. A system according to claim 11, wherein the second processing module is further configured to transmit the alert to the first monitoring system and the second monitoring system.

13. A system according to claim 11, wherein the correlation is an activity of a workflow.

14. A system according to claim 11, wherein, when the first video proxy is generated in a first format that is compatible with the first monitoring system and the second video proxy is generated in a second format that is compatible with the second monitoring system, the first format and the second format being different, the second processing module being further configured to:

convert the first video proxy into the second format, or convert the second video proxy into the first format.

15. A system according to claim 11, wherein the first monitoring system includes a local database, the first monitoring system being configured to compare content of the local database, related to the event under surveillance, with the first video proxy.

16. A system according to claim 15, wherein the second monitoring system includes a local database, the second monitoring system being configured to compare content of the local database, related to the event under surveillance, with the second video proxy, the comparison being concurrent with the comparison performed by the first monitoring system.

17. A system according to claim 11, wherein the database is a centralized database.

18. A system according to claim 11, wherein the first video master and the second video master are output from live feeds of the event under surveillance.

19. A system according to claim 11, further comprising:

a workflow engine configured to process the request to determine a format of the mapped portion in response to the request, and transmit the mapped portion to the first monitoring system at a specified time and in the determined format.

20. A system according to claim 11, wherein the first video proxy is received by a network device including a handheld computer, a wireless personal digital assistant (PDA) device, or a personal computer.

21. A method comprising:

recording an event, under surveillance, to output a high resolution video master;

generating a lower resolution video proxy, relative to the video master;

transmitting the video proxy to a central monitoring system that is configured to correlate the video proxy with other video proxies, received from a plurality of sources of other recordings of the event under surveillance;

receiving, from the central monitoring system, an alert related to the event under surveillance, based on a level of correlation, between the video proxy and at least one of the other video proxies, determined at the central monitoring system;

receiving a request for access to a mapped portion of the high resolution video master based on frame information derived from the correlating of the video proxy with the at least one other video proxy, and transmitting the mapped portion in response to the request.

22. A method according to claim 21, wherein the central monitoring system is further configured to coordinate output of the alert to the plurality of sources.

23. A method according to claim 21, further comprising:

transmitting the video master to the central monitoring system for storage.

24. A method according to claim 23, further comprising:

reviewing the video proxy for a desired sequence of frames; and transmitting a request, to the central monitoring system, for a portion of the stored video master corresponding to the desired sequence.

25. A system comprising:

a video server configured to record an event, under surveillance, to output a video master and to generate a video proxy of the video master; and a monitoring server configured to:

transmit the video proxy to a central monitoring system that is configured to correlate the video proxy with other video proxies from a plurality of sources associated with recordings of the event under surveillance, and receive, from the central monitoring system, an alert related to the event under surveillance, based on a level of correlation, between the video proxy and at least one of the other video proxies, determined at the central monitoring system;

receive a request for access to a mapped portion of the video master based on frame information derived from the correlating of the video proxy with the at least one other video proxy, and transmit the mapped portion in response to the request.

26. A system according to claim 25, wherein the central monitoring system is further configured to coordinate output of the alert to the monitoring server and the plurality of sources.

27. A system according to claim 25, wherein the video server is further configured to transmit the video master to the central monitoring system for storage.

28. A system according to claim 27, wherein the monitoring server is further configured to review the video proxy for a desired sequence of frames, and to transmit a request, to the central monitoring system, for a portion of the stored video master corresponding to the desired sequence.

* * * * *